(No Model.)

J. L. HAYDEN.
FRICTION CLUTCH.

No. 444,436.

2 Sheets—Sheet 1.

Patented Jan. 13, 1891.

WITNESSES
John H. Taylor.
Ellen B. Tomlinson.

INVENTOR
Joseph L. Hayden
by Alex. P. Browne,
attorney (No Model.) 2 Sheets—Sheet 2.
J. L. HAYDEN.
FRICTION CLUTCH.

No. 444,436. Patented Jan. 13, 1891.

WITNESSES.
John H. Taylor.
Ellen B. Tomlinson.

INVENTOR
Joseph L. Hayden
by Alex. P. Browne,
attorney.

UNITED STATES PATENT OFFICE.

JOSEPH L. HAYDEN, OF PORTSMOUTH, NEW HAMPSHIRE.

FRICTION-CLUTCH.

SPECIFICATION forming part of Letters Patent No. 444,436, dated January 13, 1891.

Application filed August 14, 1890. Serial No. 361,990. (No model.)

*To all whom it may concern:*

Be it known that I, JOSEPH L. HAYDEN, of Portsmouth, in the county of Rockingham and State of New Hampshire, a citizen of the United States, have invented certain new and useful Improvements in Friction-Clutches, of which the following is a specification.

My invention relates to that class of mechanism whereby connection is made or broken between a driving-pulley and a shaft to be driven, such mechanism being ordinarily known as a "friction-clutch."

The object of my present improvement is to produce a device which shall be simple, cheap, and certain, and which particularly shall have the capacity of being self-binding—that is to say, that the greater the work to be done the tighter will the clutch be clamped to the shaft by reason of my improved construction.

In the accompanying drawings I have represented a device embodying my improvement in the form now best known to me.

Figure 1:
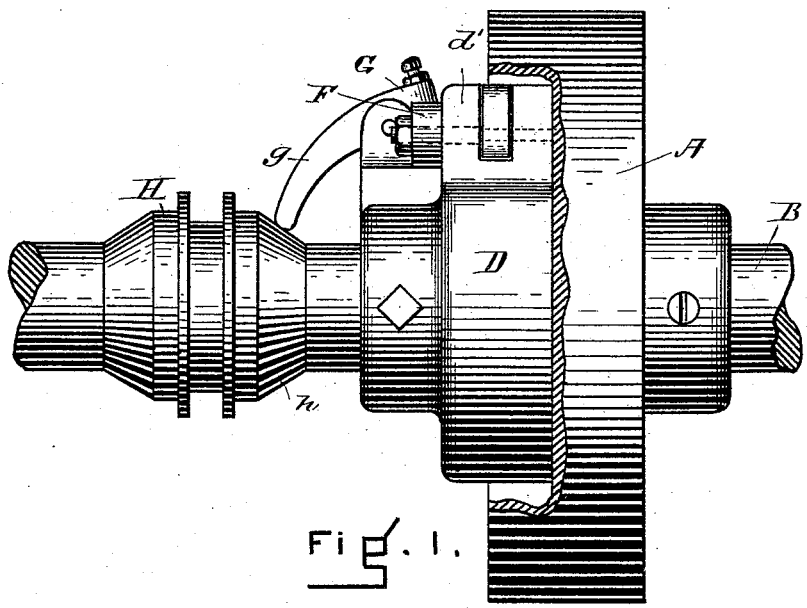
Figure 2:
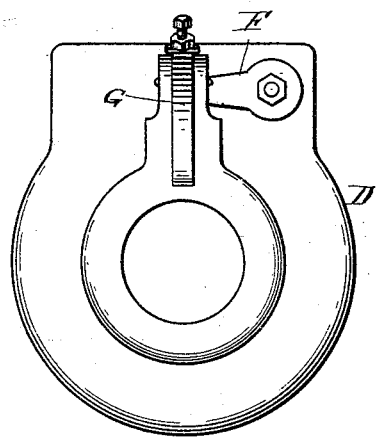
Figure 3:
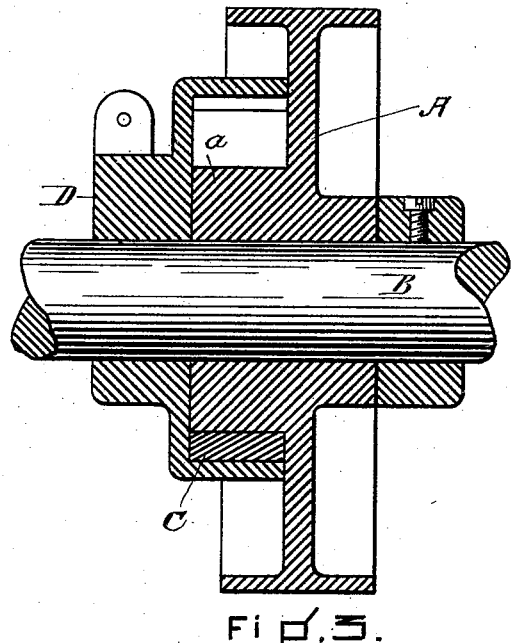
Figure 4:
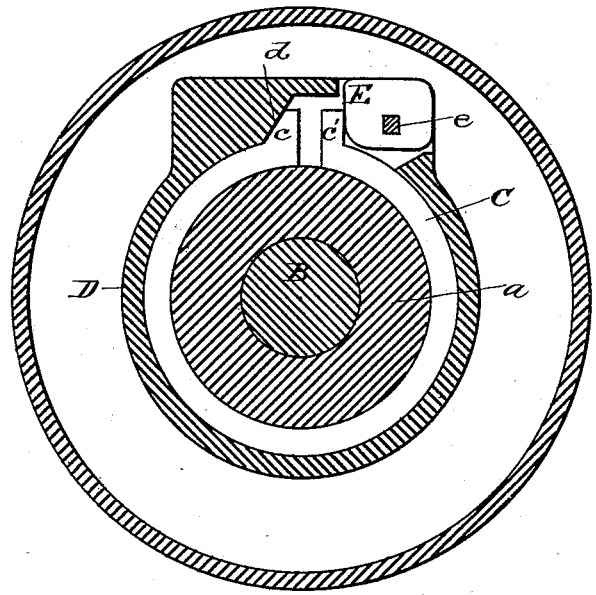

Figure 1 is a side view, and Fig. 2 an end view with the slide omitted. Fig. 3 is a vertical section showing the pulley, ring, and box; and Fig. 4, a similar cross-section showing the same parts and the cam-piece.

In the drawings, A represents the driving-pulley and B the shaft to be driven. The pulley A is provided with a hub $a$, with which the clutch mechanism engages. This consists of a cut ring C, preferably formed of composition. (See Fig. 4.) This ring is fitted to and surrounds the hub $a$. The ring when constructed as described is adapted when compressed to hug the hub of the pulley by reason of the friction between them. This ring is also inclosed within a box D, rigidly attached to the shaft B. A portion $c$ of the ring abuts against an opposed portion $d$ of the box, and the two opposed portions $c\ d$ are made wedge shape, or so that as the ring by the friction between it and the hub of the driving-pulley is pressed toward the box wedge action between them will force the ring to hug the hub of the pulley.

To cause the clutch-ring C to engage with the hub of the pulley, so as to create friction between them to start the wedge action before referred to, I have provided a cam-piece E, the shaft $e$ of which is journaled in ears $d'$, formed upon the box D, Fig. 1. Secured to this shaft E is a lug F, (see Figs. 1 and 2,) by means of which the shaft may be rocked to throw the cam-piece. The tail of this lug lies within the path of a lever G, also pivoted upon the box D. A slide H upon the shaft B is provided with a beveled portion $h$, upon which the tail $g$ of the lever G may bear when the clutch is loose. To lock the clutch move the slide H, the beveled portion $h$ of which thereby raises the tail of the lever G. This throws the lug F and rocks the cam-piece E, which bears against the free end $c'$ of the ring C and crowds it against the hub of the pulley, thereby producing friction between the hub and the ring. Then by reason of the wedge formation, as above set forth, between the abutment $c$ of the ring and the opposed portion $d$ of the box the ring is caused to lock tightly upon the hub of the pulley. It is obvious that the pulley should be set so as to revolve in the direction of this wedge action, which will then always tend to cause the ring to hug the pulley more closely as the strain upon the pulley is increased.

I consider the broad novel feature of my improvement to lie in the ring surrounding the hub of the pulley and having the described wedge relation with some part fast to the shaft—as, for instance, the box D. The specific mechanism shown for producing initial friction between the ring and the pulley I believe to be well adapted for the purpose; but its construction may be materially varied and other constructions might be substituted therefor. It will be observed that very slight power is required to produce a sufficient amount of friction between the ring and the pulley-hub in order to set up the wedge action described. This feature of my improvement adapts it very well to use under circumstances where a clutch requiring the exertion of any considerable manual power would be inconvenient.

I claim—

1. A friction-clutch consisting of a driving-pulley, a shaft to be driven, a cut ring surrounding the hub of the pulley and adapted when compressed to hug the same, a part, as D, rigidly attached to the shaft to be driven, means, substantially as described, for producing initial friction of the ring upon the pulley-hub, and a wedge connection between the said part attached to the shaft and the cut ring, substantially as and for the purpose set forth.

2. In a friction-clutch, the combination, with the driving-pulley and its hub, of a shaft to be driven, a box secured to said shaft and surrounding the said hub, a cut ring interposed between the hub and the box, a wedge connection between the said ring and the opposed portion of the box, and means, substantially as described, for producing initial friction of the ring against the hub to lock the clutch by wedge action, as set forth.

3. In combination, the pulley A, provided with a hub $a$, the shaft B, the box D, secured thereto and surrounding the said hub, provided with a wedge-formed abutment $d$, the ring C, arranged between the hub and the box and provided with the abutment $c$, the cam-piece E, bearing against the free end $c'$ of the ring and mounted upon the shaft $e$, the lug F, secured thereto to rock the same, and the lever G and slide H for operating the same, as set forth.

In testimony whereof I have hereunto subscribed my name this 31st day of July, A. D. 1890.

JOSEPH L. HAYDEN.

Witnesses:
F. I. SHACKLY,
JOHN J. LASKEY.